United States Patent [19]

Irigoyen et al.

[11] Patent Number: 4,769,584

[45] Date of Patent: Sep. 6, 1988

[54] ELECTRONIC CONTROLLER FOR THERAPEUTIC TABLE

[75] Inventors: Mario J. Irigoyen, Worth; Michael J. Skubic, Lockport, both of Ill.

[73] Assignee: Thomas J. Ring, Harvey, Ill.

[21] Appl. No.: 746,201

[22] Filed: Jun. 18, 1985

[51] Int. Cl.⁴ .............................................. G05B 11/32
[52] U.S. Cl. .................................... 318/648; 318/281; 318/434; 318/488; 5/66
[58] Field of Search ............. 318/602, 488, 281, 282, 318/625, 434; 5/62, 66; 74/22 R

[56] References Cited

U.S. PATENT DOCUMENTS

| | | | |
|---|---|---|---|
| Re. 31,581 | 5/1984 | Richter | 318/488 X |
| 3,825,811 | 7/1974 | Smith et al. | 318/646 |
| 4,128,797 | 12/1978 | Murata | 318/568 X |
| 4,264,849 | 4/1981 | Fleischer et al. | 318/568 |
| 4,322,668 | 3/1982 | Trussler et al. | 318/434 |
| 4,335,342 | 6/1982 | Tholome | 318/282 X |
| 4,392,096 | 7/1983 | Gravewski | 318/625 |
| 4,435,862 | 3/1984 | King et al. | 318/568 X |
| 4,467,252 | 8/1984 | Takeda et al. | 318/568 X |
| 4,475,072 | 10/1984 | Schwer et al. | 318/602 |
| 4,563,625 | 1/1986 | Kornbrekke et al. | 318/602 X |
| 4,574,226 | 3/1986 | Binder | 318/434 X |

*Primary Examiner*—Benjamin Dobeck
*Attorney, Agent, or Firm*—Thomas J. Ring

[57] ABSTRACT

An electronic controller for a therapeutic table with a shaft encoder for sensing the angular position of a movably mounted patient support and means for controlling the movement in accordance with a comparison between the sensed angular position and an angular limit reference. The left and right preselected tilt angles are alternately automatically selected as the reference. Fault conditions, such as a jam condition, occurs when the drive mechanism to briefly reverse to automatically correct the condition prior to power termination. In the event of excessive tilt, actuation of limit switches results in reversal and movement of the patient support to a horizontal position before power termination. The jam condition is sensed by a strain gauge for detecting the work required for movement of the patient support and comparing it to a preselected work reference. In the event of drive clutch disengagement, power to the motor is terminated.

27 Claims, 4 Drawing Sheets

ELECTRONIC CONTROLLER FOR THERAPEUTIC TABLE

BACKGROUND OF THE INVENTION

Therapeutic tables, or beds, of the type which have a frame, a patient support mounted to the frame for periodic, reciprocal rocking or tilting movement, a power drive train for such movement and a controller for the drive train are well known. Examples of such tables are shown in international application No. PCT/US83/01298, published Mar. 14, 1985, under Publication No. WO 85/0097, and the patents cited therein.

Electronic controllers for such tables are shown both in the aforementioned, patent application and in the following U.S. Pat. Nos.: 3,247,528 of Swenson et al.; 3,793,652 of Linehan et al.; 4,277,857 of Szehaug; and 4,194,499 of Donnelly, Jr.

In the table of the aforementioned patent application, the patient support is mounted to the frame for pivotal movement around its elongated axis in a side-to-side periodic tilting action. In addition, its pitch, or Trandelenberg angle, is adjustable to permit tilting of the bed around an axis transverse to its elongate axis. This type of Trandelenberg positioning is also shown in the above U.S. patents.

An important consideration in the beneficial use of such therapeutic tables is the reliability of control. In the controller of the aforementioned patent application, the amount of movement was controlled via the timing that drive powered was applied. It was assumed the drive would operate at a fixed rate and thus if it operated for a known time, the degree of tilt could be controlled. While this approach functions satisfactorily, it, of course, lacks the positive and absolute control that can be achieved only by direct measurement of the tilt angles during the periodic movement of the patient support.

In any event, the degree of maximum tilt on either side of a horizontal reference should be adjustable independently of one another. While independent control of the degree of tilt to both the left and the right of horizontal was achieved with the controller of the aforementioned patent application, such control again relied upon the timers and asumptions concerning drive speed.

When the movements of the patient support relative to the frame of the therapeutic table are powered by means such as electric motors, it is imperative from both a safety and an equipment protection viewpoint to minimize the continuation of drive power in the event of a jam condition. Such a jam condition could result from other hospital equipment interfering with the movement of the patient support. While the use of slip clutches and emergency clutch release mechanisms are known, these approaches do not function to automatically correct the jammed condition, although they may alleviate it. Instead, they depend upon operator involvement to correct the jammed condition.

Another difficulty with known therapeutic tables is that the setting of tilt limits has often been cumbersome or awkward and displays and other feedback information to the operator have been less than adequate to facilitate easy set-up operation and monitoring.

SUMMARY OF THE INVENTION

It is therefore a principal object of the present invention to provide an improved controller for a therapeutic table which overcomes or alleviates the problems or disadvantages of known controllers such as those noted above.

This objective is achieved in part through provision of a controller for therapeutic table in which the reliability is improved through measurement and direct feedback of the actual angular positions of the patient support during relative movement thereof with respect to the frame of the therapeutic table. In a preferred embodiment, the controller comprises means for electronically sensing a plurality of successive positions of the patient support during relative movement thereof, means for electronically encoding a preselected positional reference, means for successively comparing the sensed relative positions with the angular positional reference during said relative movement and means for controlling the drive mechanism in accordance with that comparison. The sensing means senses the angle of tilt of the patient support such as a synchronized shaft encoder.

Thus, it is a particular object of the present invention to provide an improved controller comprising means for sensing the angular position of the patient support relative to the horizontal position on either side thereof, means for preselecting a first angular reference position on one side of the horizontal position, means for preselecting a second angular reference position on the other side of the horizontal position opposite the one side independently of preselection of the first angular position, means for causing the patient support to rotate in one direction until it reaches said first angular reference position and means for causing the patient support to rotate in another direction opposite said one direction when it reaches said second angular reference position. In a preferred embodiment, the patient support is caused to momentarily pause when it reaches either of the preselected angular reference positions to minimize rapid direction reversals. In addition, the controller includes simple means, such as thumb-wheel encoders, for manually preselecting each of the preselected reference angles and has means associated with the preselecting means for displaying a numerical indication of either the preselections or the actual tilt angle.

Yet another feature of the present invention is the provision of means for preventing preselection of an angular position beyond a preselected maximum limit position. In such event, a visual indication is provided of the invalid input selection and the starting of operations is inhibited. A further safety advantage is achieved through achievement of another objective which is provision of an improved controller for controlling the relative movement of a patient support of a therapeutic table comprising means for controlling a drive mechanism for movement of the patient support in accordance with a comparison between the mechanical work required for the relative movement as measured by suitable sensor with a preselected mechanical work reference. In the event of a jam condition, the mechanical work required for the relative movement dramatically increases and this phenomenon is used to sense the jammed condition directly so that immediate corrective action can be taken. In a preferred embodiment, the mechanical work measuring includes a strain gauge for measuring strain on a member which varies with variations with the mechanical work required to move the patient support. In a preferred embodiment, the jammed condition is automatically corrected, for the controlling means causes the patient support to rotate in a direction opposite to the direction it was going when the jammed condition arose for a preselected brief time period before power is terminated. The fault condition indicator then informs the operator that a fault condition has previously occurred.

The objective of improved safety is further achieved through achievement of another object of the invention of providing an improved controller for a therapeutic table comprising means for controlling a drive mechanism for powering periodic relative movement of the patient support to cause periodic reversal of the relative movement of the patient support, means for sensing a fault condition and means responsive to the sensing means to reverse relative movement of the patient support irremediate periodic reversals. In the preferred embodiment, the fault condition not only includes the jam condition as noted above, but may also include the condition of excessive tilting beyond a limit set by a fail-safe limit switch. In such case, the direction of rotation of the drive mechanism is reversed and power continues to be applied until the patient support returns to a horizontal position at which time power is terminated and a fault indication is provided.

Greater safety and equipment protection is further achieved with the present invention through achievement of the particular object of providing an improved controller for a therapeutic table having a frame, a patient support movably mounted to the frame, a motor and means including a clutch for applying drive power from the motor to the patient support to cause periodic reciprocal relative movement of the patient support in which means are provided for detecting such disengagement and means responsive to clutch disengagement for removing electrical power from the motor. In a preferred embodiment, if such a condition occurs, the patient support must be returned to a horizontal position before a fault indication is terminated and the controller is again enabled to operate in a normal fashion.

BRIEF DESCRIPTION OF THE DRAWINGS

The foregoing objects, features and advantages will be described in greater detail and further advantageous features will be made apparent from a reading of the following detailed description which is given with reference to the several figures of the drawings, in which.

DETAILED DESCRIPTION

Figure 1:
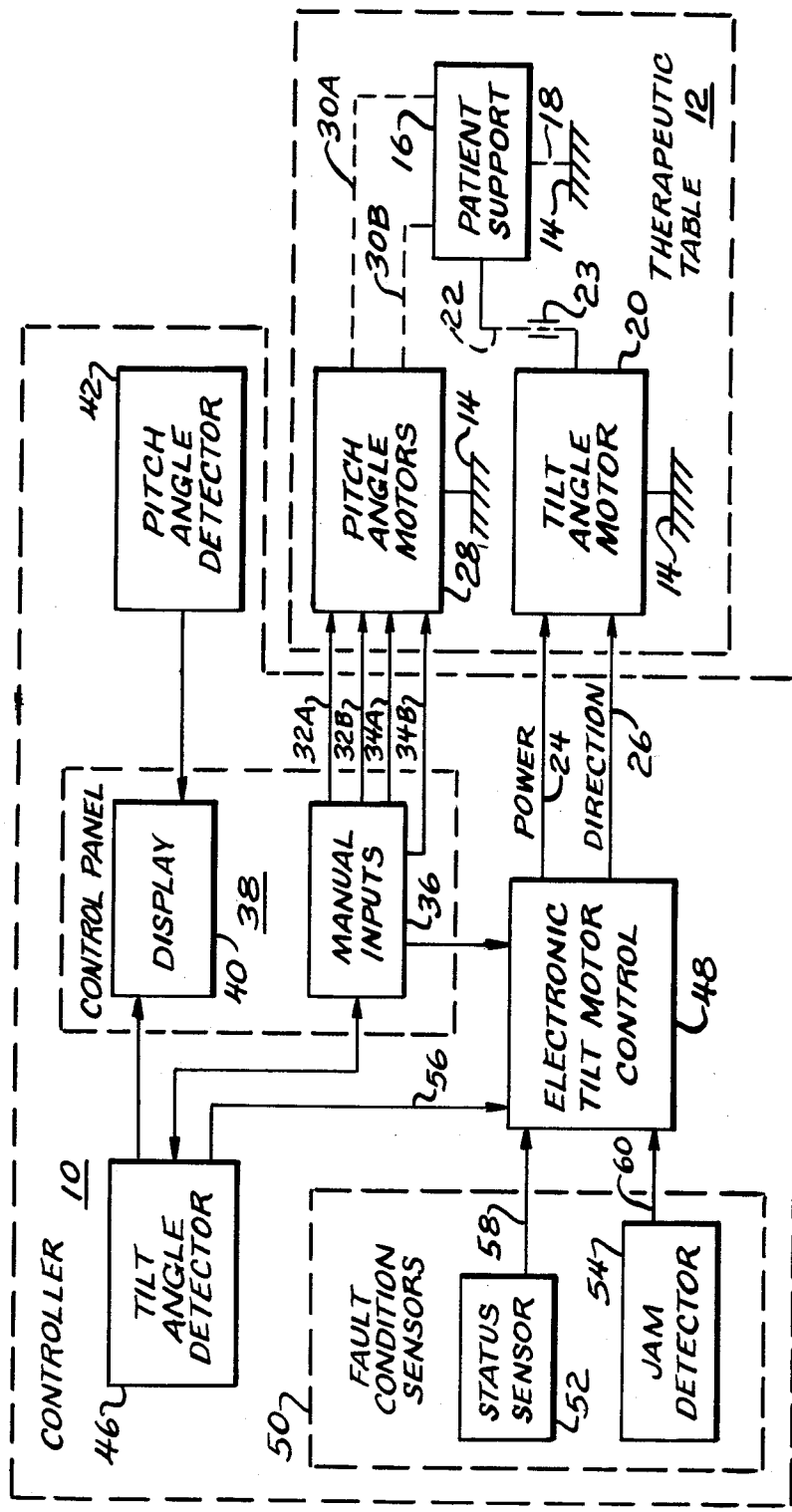
FIG. 1 is a broad functional block diagram of the controller 10 in combination with a therapeutic table having both a tilt motor and a Trandelenberg or pitch angle motor.

Referring now to FIG. 1, the controller 10 as used with a therapeutic table 12 is illustrated in functional block form. The details of the structure of the therapeutic table 12 form no part of the present invention, but if such information is sought, a suitable therapeutic table for use with the controller 10 is disclosed in PCT application No. PCT/US83/01298 published Mar. 14, 1985 under International Publication No. WO 85/00967 and entitled "Therapeutic Table". Other beds or tables having movable patient support surfaces are shown in the patents cited in the aforementioned PCT application and also in the patents cited above in this application.

Briefly, the therapeutic table 12 includes a frame 14 to which a patient support 16 is mounted for relative movement via a suitable movable mounting apparatus 18. In a preferred embodiment, the patient support 16 is mounted for rotatable movement about an elongate center axis of the bed to enable it to periodically and reciprocally pivot, or tilt, from one side of horizontal to the other. Power for such rotary or tilting movement of the patient support is provided by a reversible tilt angle motor 20 mounted to frame 14 and connected to the patient support 16 through a rotary drive mechanism or system 22 including a manually actuatable release clutch. When the tilt angle motor 20 receives electrical power at its input 24, it rotates in one of two directions which, accordingly, causes the patient support 16 to tilt either away or toward a horizontal position.

The direction in which the tilt angle motor 20 rotates depends upon the state of direction input 26. If the direction input 26 is in one state, such as a logic 1-state, then the tilt angle motor rotates in one direction and the patient support is driven to tilt in an associated direction, such as to the left. If the direction input 26 is in an opposite state, such as a logic 0-state, then the tilt angle motor rotates in an opposite direction, and the patient support pivots or tilts in the associated opposite direction, such as to the right.

The patient support 16 is also mounted for relative pivotal movement about transverse axes to enable the head of the patient support 16 to be raised or lowered to a level higher or lower than the opposite foot end of the patient support 16. When the foot end of the patient support 16 is above the level of the head end, the patient support 16 is said to be in a Trendelenberg position. When the foot end of the patient support 16 is lower than the head end, the patient support 16 is said to be in a reverse Trandelenberg position.

The angle that the elongate axis of the patient support 16 makes with respect to a horizontal plane is referred to herein as the Trendelenberg angle, or pitch angle. The pitch angle of the patient support 16 is controlled through means of a pair of reversible pitch angle motors 28 which are mounted to frame 14 and respectively connected to patient support 16 through direct vertical drive mechanism, or systems, 30A and 30B at the head end and foot end of the table. When one of the pitch angle motors 28 rotates in one direction, the end of the patient support 16 to which it is connected is raised, and when the pitch angle motor 28 is caused to rotate in the opposite direction, that end of the patient suport 16 is lowered. Both the application of power on input power leads 32A and 34A and the direction of rotation signal on a direction inputs 32B and 34B are manually selected from manual inputs 36 of a control panel 38.

Figure 2:
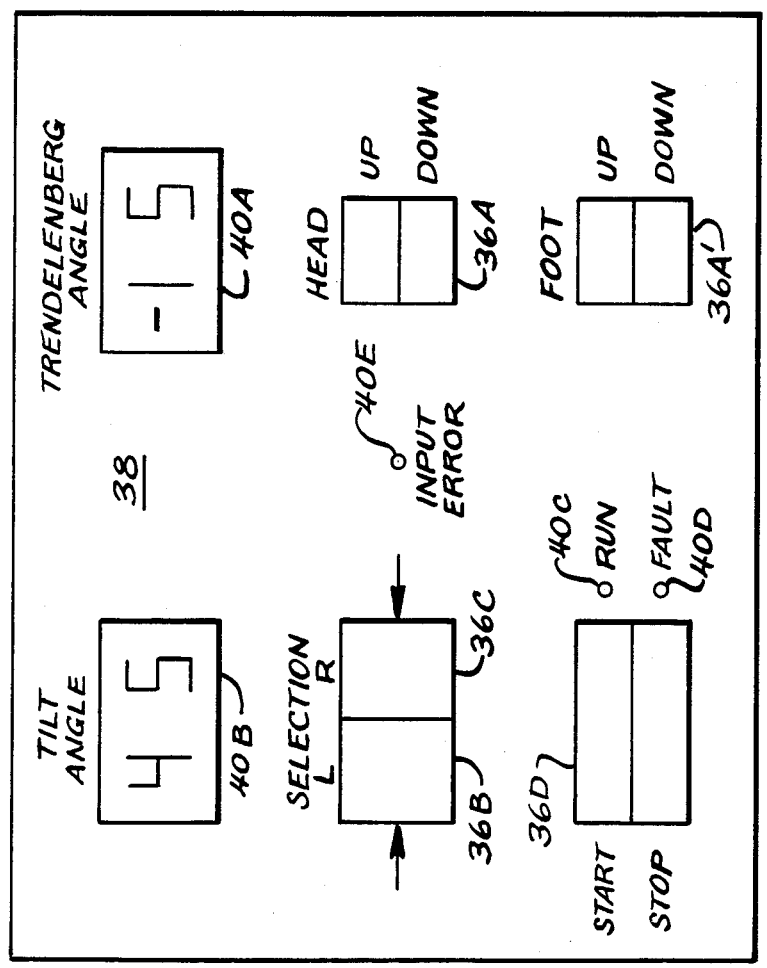
FIG. 2 is a schemmatic plan view of the control panel functional block of FIG. 1.

As also seen in FIG. 2, the control panel 38 includes a display 40 including a Trandelenberg angle, or pitch angle, display unit 40A. The inputs 36 also includes up/down rocker switches 36A and 36A' which selectively control the application of power to power inputs 32A and 34A, respectively, and of direction input signals to direction inputs 32B and 34B. It is intended that the operator will actuate one or both of the up/down switches 36A and 36A' for movement in the desired direction until the desired Trandelenberg angle which has been selected by the operator is displayed at display unit 40A. Upon release of either one of the up/down rocker switches 36A and 36A', it automatically returns to a neutral position. As will be explained in more detail hereinafter, the display 40A receives pitch angle information from the output of a pitch angle detector 42 which, in turn, receives pitch angle sensor data from a rotary shaft encoder.

Referring again to FIG. 2, unlike the Trendelenberg control portion of the controller 10, the tilt angle control portion of the controller 10 operates automatically. As seen, instead of up/down rocker switch 36A and 36A', two pairs of thumb wheel tilt angle selection encoders 36B and 36C are provided for respectively selecting a left tilt angle, or right preselected positional reference, and a right tilt angle, or right preselected positional reference. Any angle between zero degrees and 69 degrees may be selected, and the choice of the left tilt angle is selectable independently of the selection of the right positional reference.

The tilt angle detected by pitch angle detector 42 is shown in display unit 40B for monitoring purposes only. Once a start/stop input switch 36D is placed in its start position and a valid start condition is achieved, the controller 10, as will be explained, works automatically to slowly tilt the patient support 16 in one direction until the associated positional reference selected on one of the thumb wheel encoder 36B and 36C is reached. Then, after a short pause, the controller 10 causes the patient support 16 to tilt in the opposite direction until the other selected tilt angle positional reference on the other of the thumb wheels has been reached. So long as this automatic operation continues, a run light indicator 40C is lit, but when a fault condition occurs, the run lamp 40C is turned off and a fault indicator lamp 40D is lit instead. A further output indicator comprises an input error lamp 40E which is lit in the event a tilt angle in excess of 69 degrees is selected on either of the selection thumb wheel encoding 36B and 36C.

Referring still to FIG. 1, the controller 10 is seen to include, in addition to control panel 38 and pitch angle detector 42, a tilt angle detector 46, an electronic tilt motor control 48 and fault condition sensors 50. The fault condition sensors 50 include status sensors 52 and, in keeping with an important aspect of the present invention, a jam detector 54.

As will be explained in greater detail with reference to FIGS. 3 and 4, the tilt angle detector 46 functions to electronically sense a plurality of successive angular positions of the patient support during relative movement thereof. These tilt angles are successively compared with the selected one of the angular positional references manually chosen through means of thumb wheel encoders 36B and 36C, as noted above. The two positional references are, in effect, mechanically stored by virtue of the physical positions of the thumb wheel which also encodes them. The selected one of the encoded positional references is then selected by means included in the tilt angle detector 46. During normal operation, the patient support 16 periodically tilts from side to side. However, in the event of a fault condition, this normal cycle is interrupted and a fault indicates lamp is activated.

Figure 3:
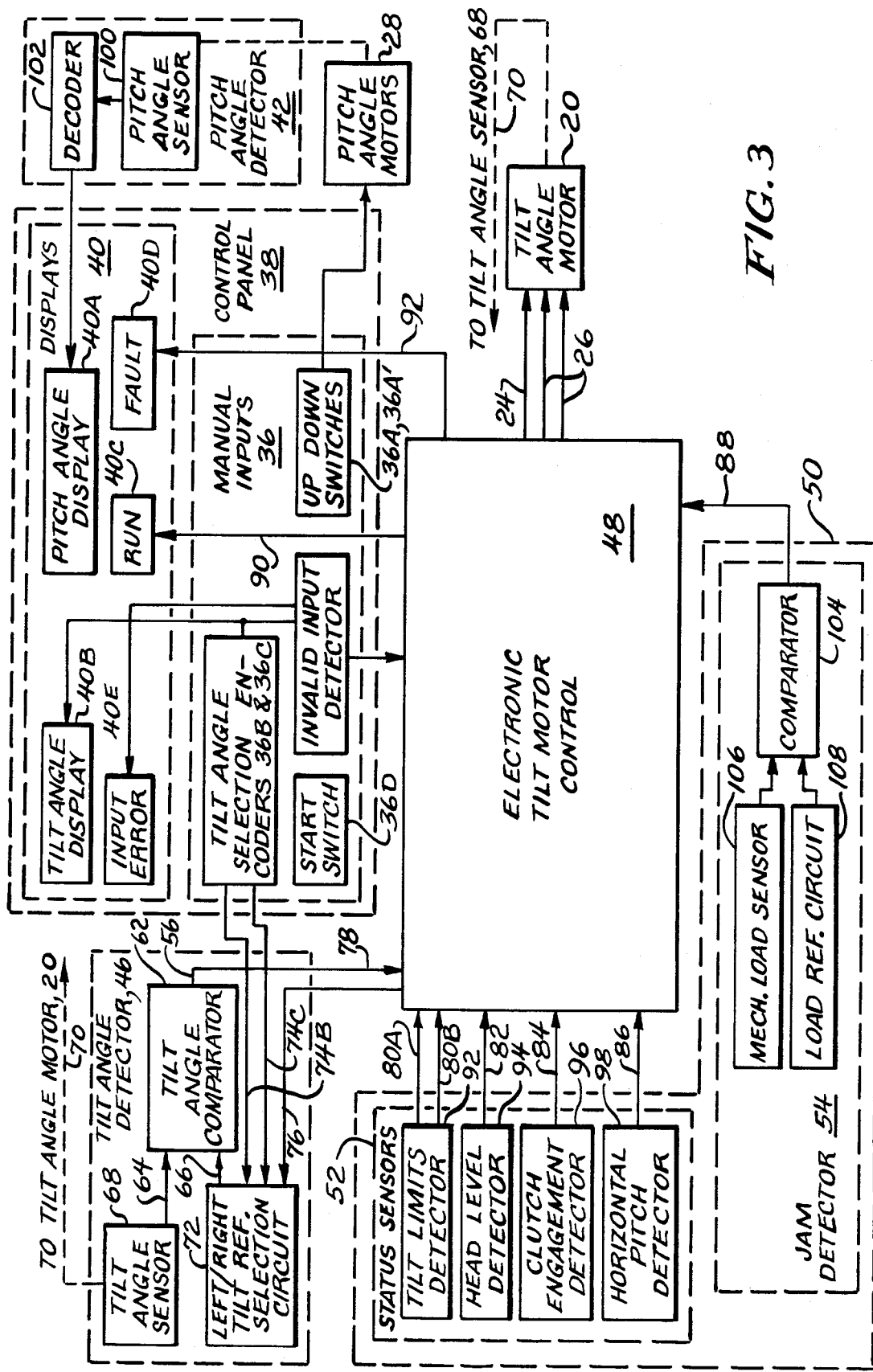
FIG. 3 is a detailed functional block diagram corresponding to the functional block diagram of the controller of FIG. 1.

Referring now to FIG. 3, the output 56 of tilt angle detector 46 is seen to be taken from a tilt angle comparitor 62 which compares an actual tilt angle signal applied to its input 64 with a selected one of a pair of binarily encoded selected tilt angles applied to its input 66. The binarily encoded detected tilt angles applied to input 64 is taken from a tilt angle sensor 68. The tilt angle sensor 68 can be any of various types of sensors capable of determining the tilt of the patient's support 16 relative to a horizontal reference and encoding that into a suitable electrical signal.

However, preferably, the tilt angle sensor comprises a shaft encoder connected to tilt angle motor 20 via a linkage 70. While various types of shaft encoders can be employed, preferably the shaft encoder is an optical incremental shaft encoder which produces one leading and one lagging output pulse for each one degree of rotation and, in addition, produces one reference pulse per cycle. While an absolute positioning encoder could be employed, such an absolute positioning encoder is presently significantly more expensive than an incremental encoder, and accordingly one is not employed even though from a functional viewpoint it might be preferred.

Advantageously, the additional expense of an absolute positioning encoder is avoided through use of a unique synchronizing circuit to ensure that a given pulse count corresponds to only one tilt angle position. Briefly, the setting and count enablement of a binary counter is synchronized with a horizontal position sensor and the output reference pulse from the shaft encoder. The binary output of the counter as presented to input 64 of tilt angle comparitor 62 therefore represents a particular and unique angular tilt position of the patient support 16.

The binary coded signal applied to input 66 is supplied by a left/right tilt reference selection circuit 72. The tilt reference selection circuit 72 has two sets of binary encoded inputs 74B and 74C respectively representative of the angles selected from tilt angles selection encoders 36B and 36C of FIG. 2. The tilt reference selection circuit also has a selection input 76 obtained from electronic tilt motor control 48.

Whenever the electronic tilt motor control 48 senses a condition from its various inputs calling for reversal of the tilting motion of patient's support 16, it generates one of two binary signals representative thereof, and the left/right tilt selector circuit applies a corresponding binarily encoded left or right tilt angle reference at inputs 74B and 74C to input 66 of the tilt angle comparitor 62. As soon as the binary code at input 64 is the same as the binary code at input 66, the tilt angle comparitor 62 generates a comparison detection signal on its output 56 which is applied to an input 78 of electronic tilt motor control 48.

In response to this signal, the electronic tilt motor control 48 also reverses the polarity on direction outputs 26 to reverse the direction of tilt angle motor 20. It also momentarily removes power from power input 24 to cause the motor to momentarily pause before reversing direction.

Once started, the controller 10 continues to operate automatically in this fashion unless an override signal is applied to one of five override inputs 80A and 80B, 82, 84, 86 and 88. During normal operation, an actuation signal is provided on an output 90 of electronic tilt motor control 48 which is applied to actuate run lamp 40C. In the event one of the override signals is applied to any of the override inputs 80A through 88, however, the run actuation signal is removed from output 90 and a fault actuation signal is generated on an output 92 which is applied to a fault lamp 40D.

The fault condition sensors include four status sensors which are respectively coupled to override inputs 80A and 80B, 82, 84 and 86. The inputs 80A and 80B are respectively coupled to two outputs of a tilt limit detector 92 which comprises a pair of limit switches for respectively providing override signals in the event that the maximum tilt angle to the left or to the right is exceeded. These limit switches may be mechanical motion limit or electronic proximity switches, but in either event, each is actuated in response to the movement of a preselected positional element of the patient support or the rotary drive train into a preselected limit position adjacent to the limit switch.

Input 82 of electronic tilt motor control 48 is received from a head level detector 94. As previously indicated, the patient support 16 includes a head support which is adjustable from a level position with respect to the remainder of the patient support 16 to a raised position. It is desired to avoid relative tilting movement of the patient support 16 when the head support portion is in the raised position. Accordingly, the head level detector 94 includes a switch which is actuated in response to raising of the head support. This results in the application of an override signal to output 82 until the head support is returned to a level condition.

The override signal applied to input 84 is obtained from a clutch engagement detector 96. The drive mechanism 22 including manually deactivatable clutch 23, FIG. 1, may be used in an emergency situation to separate the drive in 22 and thus tilt angle motor 20 from the patient support to allow quick return of the patient support 16 to a horizontal position. When the clutch 23 is disengaged, the tilt angle motor 20 serves no function. There is no need for the application of electrical power to the tilt angle motor 20 and it is desired to stop the movement of the tilt angle motor before the clutch is again re-engaged. Accordingly, the clutch engagement detector includes a switch which is actuated in response to disengagement of the clutch to provide an override signal to input 84 of the electronic tilt motor control 48.

A horizontal pitch detector 98 provides an override signal to override input 86 when the patient support 16 is other than in a level condition when power is first applied to controller 10. This override signal is presented to the electronic tilt motor control 48 only when power is first connected to the unit and the patient support 16 has passed through the horizontal position for the first time. This is required to synchronize a pitch angle sensor 100 and an associated decoder 102 of pitch angle detector 42. The pitch angle sensor 100 is substantially identical to the tilt angle sensor 68 and is preferably also a photo-optical shaft encoder. This horizontal pitch detector includes a flip-flop which is set to enable operation upon actuation of the start switch only after the pitch angle detector has been initialized.

The override signal applied to override input 88 is obtained from the output of a comparitor 104 which compares the output of a mechanical load sensor 106 with the fixed output of a load reference circuit 108. The mechanical load sensor 106 can comprise any number of suitable devices for producing a signal representative of the work required to tiltably rotate the patient support 16. Preferably, the mechanical load sensor includes a strain gauge attached to a member which is strained in a known relationship with changes in the work load. Alternately, the electrical power drawn or produced by the electrical motor can be measured electronically and used to indicate a substantial increase in mechanical work, or power, which results when the free movement of the patient support 16 is interfered with, as if jammed. This fault detection minimizes possible injury or damage to the therapeutic table 12 and the motor 20. The electronic tilt motor control 48 responds to the signals applied to its override inputs in various ways in addition to those indicated above depending upon the nature of the override signal and provides output signals to the various other elements of the controller 10 in manner which is described below with reference to FIG. 4.

Figure 4:
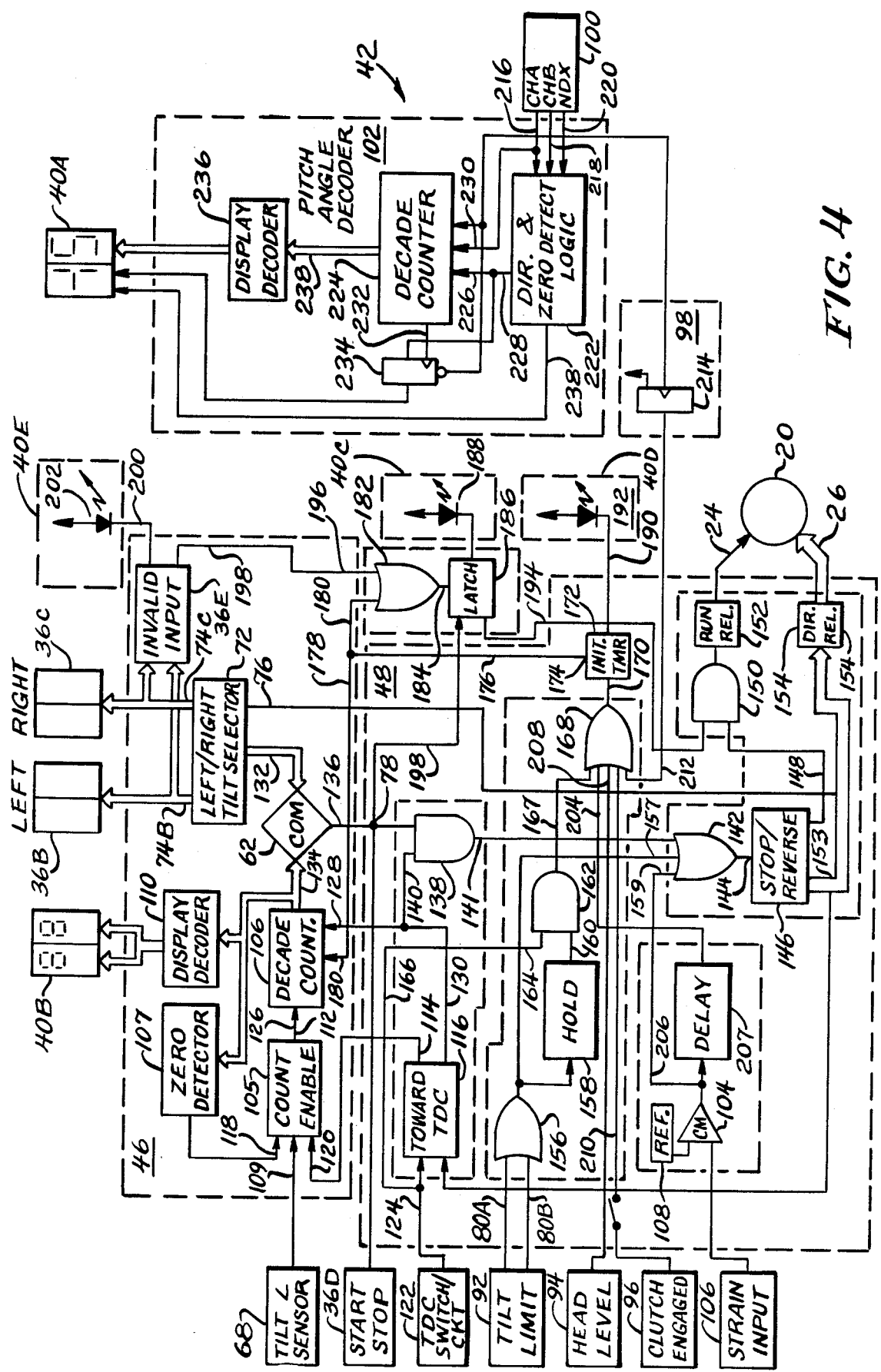
FIG. 4 is a partially schemmatic, partially functional block diagram of a preferred circuit embodiment of the controller of FIG. 1.

Referring now to FIG. 4, the tilt angle detector 46 is seen to include a count enable logic circuit 105, an up/down resettable decade counter 109, a zero 108 and a display decoder 110 in addition to the tilt angle 68, comparitor 62 and left/right tilt reference selector 72. The display decoder 110 simply decodes the binary output from decade counter 106 into a seven bar character code needed for proper operation of tilt angle display 40B. The count enable logic circuit 105 conditions the encoder input signal from tilt angle sensor 68 applied to its input 109 and then provides that conditioned sensor signal to decade counter 106 on its output 112. The count enable logic circuit 104 applies the conditioned tilt angle sensor input signal produced on its output 112 to the input 126 of decade counters 106, but only when the count of decade counters 106 is not zero as detected by zero detector 108. The output of zero detector 107 is applied to an input 118 of count enable logic circuit 105 and the patient support 16 is not in a horizontal position as indicated on the output 114 of a toward TDC detector 116 which is applied to an input 120 in response to a top dead center switch circuit 122 which is applied to an input 124 of toward TDC detector 116.

The decade counters 106 count the encoder pulses applied to its input 126 from count enable logic output 112. One pulse is applied to input 126 for each one degree of rotation, and the direction of the count, either up or down, is determined by a direction signal applied to a direction input 128. When a signal of one logic state is applied to input 128, the decade counter counts in one direction, and when the signal is in an opposite state, it counts in the opposite direction.

The direction input signal 128, in turn, is obtained from an output 130 of the toward TDC detector 116. The zero detector 108 detects when the decade counter 106 has a count of zero and disables the count enable logic from passing any further pulses to input 126 till the top dead center or horizontal position is reached as indicated by the signal on output 114 of toward TDC detector 116. This eliminates the cumulative error that might otherwise develop and insures that an angle of zero degrees is displayed on a tilt angle display 40B when the patient is horizontal. However, once the patient support 16 departs from the horizontal position and the top dead center switch circuit 22 is deactuated, the count enable circuit 105 is again enabled to pass pulses to decade counter 106 and counting, beginning from zero, with the patient support in the horizontal position can then continue.

The display decoder 110 both decodes the binary coded decimal output from decade counters 106 and amplifies the signals to drive the seven segment displays of tilt angle display unit 40B. At the same time, the left/right tilt selector circuits 72 provides a binary coded decimal on its output bus 132. The status of the logic states on these seven input leads of bus 132 is compared to a corresponding seven input leads on an output bus 134 from decade counters 106 by means of the tilt angle comparitor 62.

If the count represented by the logic states of output bus 134 of decade counters 106 is greater than or equal to the selected tilt reference angle represented on bus 132, then a positive comparison pulse is generated on its output 136 which is coupled to the input 78 of the electronic tilt motor control 48. This is applied to an input of an AND-gate 138 which, if it not disabled by the application of a zero state signal to its other input 140 from output 130 of toward TDC detector 116, generates a 1-state control pulse on its output 141 which is passed by OR-gate 142 to the trigger input 144 of a stop and reverse logic-circuit 146. The stop and reverse logic circuit 146, in response to the control pulse applied to its input 144, switches its output 148 to an off or 0-state which is applied to the input of an AND-gate 150. AND-gate 150, in response thereto, deenergizes a run relay 152 which disconnects electrical power to tilt angle motor 20 which would otherwise be applied thereto via power input 24.

The stop and reverse logic circuit includes a timer, having a time delay on the order of 0.5 seconds. After this half-second delay, the stop and reverse logic circuit 146 switches its on/off output 148 to an on state to re-energize run relay 152 and energize tilt angle motor 20. However, at the same time, the stop and reverse logic circuit 146 reverses the polarity of the signal on its direction output leads 153 which are applied to direction relays 154. Direction relays 154, in response thereto, causes the tilt angle motor 20 to reverse its direction via reversing signals applied to direction input leads 26. One of the output direction leads 152 is connected to the select input 76 of the left/right tilt reference selector circuit 72. This causes the left/right tilt selector circuit 72 to terminate the application of the binary encoded reference tilt angle previously being provided on output 132 and substituting therefor the other tilt angle reference. Accordingly, the tilt motor 20 is caused to continue operating and rotating the patient support 16 in the other direction until another comparison pulse is generated on the output 136 of tilt angle comparitor 62.

As previously indicated, this stop and reverse control of tilt motor 20 is also affected under various override conditions which may occur intermediate the normal periodic reversals. Thus, OR-gate 142 has a second input 157 connected to and responsive to the tilt limits detector via the output of an OR gate 156 which has a pair of inputs respectively coupled to tilt limit detector outputs 80A and 80B. Whenever a 1-state pulse appears on either of outputs 80A or 80B when the limit switch associated therewith is actuated, a 1-state pulse is applied to input 157, and OR-gate 142 applies a 1-state pulse to trigger input 144 of the stop and reverse logic circuit 146. This causes the tilt angle motor 20 to stop and reverse as described above.

The output of OR-gate 156 is also coupled to a hold circuit 158, which holds the 1-state signal from OR-gate 156 on its output 160 and applies it to the input of an AND-gate 162. Another input 164 of AND-gate 162 is coupled to the TDC switch circuit output 124 via a lead 166. When the TDC switch circuit is actuated upon the patient support 16 reaching a horizontal level, then a 1-state signal is applied to input 164. When this occurs, AND-gate 162, having been previously enabled by the 1-state output signal on hold circuit 160, generates a 1-state signal on its output 167. This output is applied to an OR-gate 168 which, in turn, generates a 1-state signal on its output 170. The 1-state signal on output 170 triggers an initializing timer 172.

The initializing timer 172, after a short initializing time period on the the order of 300 milliseconds, generates a 1-state tilt initiate signal on its output 174 which is applied via lead 176 and the lead 178 to the reset input 180 of decade counters 106. This tilt initiate signal is also applied via a lead 180 to the input of an OR-gate 182.

OR-gate 182, in response thereto, generates a 1-state signal on its output 184 which is applied to a start/stop latch. Latch 186 is reset thereby to terminate the application of power to a light emitting diode 188 of run lamp 40C.

Likewise, the initializing timer 172, generates a 0-state signal on its output 190 to actuate an LED 192 of fault lamp 40D. At the same time, a 0-state signal is produced on a run output 194 of latch 186 which is applied to another input of AND-gate 150. This causes the run relay 152 to be deactuated to remove power from the tilt motor 20.

Thus, it is seen that in the event of either of the tilt limits detectors being actuated, the tilt motor 20 is caused to reverse its direction after a momentary pause and then to return to a horizontal position. At the same time, the fault indicator lamp 40D is energized and the run indicator lamp 40C is deenergized. Further operation cannnot then be commenced until reactuation of the start/stop switch by the operator. The return to the horizontal position is most important for the comfort of the patient while he awaits the operator correction of the fault condition. Likewise, the continuous indication of the fault is necessary, so that the operator can quickly ascertain that there has been a fault.

Still referring to the latch 186, it is seen that the OR gate 182 which provides the reset pulses latch 186 also has an input 196 that is coupled to an output of the invalid input detector 36E. Whenever either of the tilt angle selection encoders 36D or 36C are set to a tilt angle reference greater than 69 degrees, a 1-state signal is applied to its output 198 which in turn is coupled to input 196 of OR-gate 182. As a consequence, actuation of the start/stop switch 36D which is coupled to latch 186 via a lead 198 is disabled from setting the latch 186 to a run condition. At the same time, the invalid input detector latch 36E produces a 0-state condition on its output 200 to energize an LED 202 of input error lamp 40E.

Referring again to OR-gate 168, it is seen that it also has an input 204 which is coupled to the output of a delay circuit 206 which, in turn, is connected to the output of a differential amplifier, or comparitor, 104 of the jammed detector circuit 54. Thus, when a jam is detected, the differential amplfier, or comparitor, 104 produces a pulse on its output 206 that is coupled to the input 159 of OR-gate 142 to actuate the stop and reverse logic circuit 146 as discussed above. However, the delay circuit 207 delays the application of this pulse to the input 204 or OR-gate 168 to allow the tilt motor 20 to continue to run in a reverse direction opposite to the jammed direction for approximately two seconds.

Thus, it is seen that in the event of detection of a jam not only is power immediately removed from the motor for a brief time period, but it is also then allowed to operate in a reverse direction to relieve any stress or strain that may have been created by the jam in the first instance. This substantially protects the tilt motors 20 against overload damage and also improves the safety of the operation of the therapeutic table.

Referring again to OR-gate 168, it is seen that it also has two inputs 208 and 210 respectively coupled to the head level detector 94 and the clutch engagement detector 96. When either of these detectors are actuated, the OR-gate 168 is caused to trigger the initializing timer 172 as described above to prevent the application of power to the tilt motor 20 by disabling AN gate 150 via latch circuit 186, as described above. However, detection does not actuate the stop and reverse logic circuit as is done in response to actuation of the tilt limits detector circuit 92 or the jam detector 54. Such action is not required since the head level detector is not related to the tilt position of the patient support 16. Likewise, when the clutch is disengaged, the tilt motor 20 cannot provide drive power to move the patient support, in any event. However, as noted above, both the fault indicator lamp 40D is actuated and the run indicator lamp 40C is deactuated in the event of actuation of either of the clutch enagagement detector 96 or the head level detector 94.

Referring still to OR-gate 168, there is one final input 212 which is taken from the horizontal pitch detector 98. As seen, the pitch detector 98 includes a flip-flop 214 with an output coupled to OR-gate input 212 and an input triggered by a zero degree reference encoder pulse from the pitch angle sensor 104. However, once this flip-flop 214 is set after power has been turned on by moving the patient support to a horizontal or neutral Trendelenberg position, further changes in the Trendelenberg position away from horizontal will not disable actuation of the tilt motor.

Referring now to the pitch angle detector 42, the pitch angle sensor 100 produces signals on three outputs, 216, 218 and 220. The sensor 100 produces a pulse train on each of outputs 216 and 218, one lagging and one leading, with one pulse being generated for each degree of movement. As previously indicated, one reference pulse is produced on the third output 220 for each cycle, in this instance, whenever a zero-degree position is being encoded. As previously noted, this zero-degree position is applied to set the input of flip-flop 214 of horizontal pitch detector 98. It, together with the other signals on outputs 216 and 218, are also applied to a direction in zero detect logic circuit 222. This direction and zero detect logic circuit 222 conditions the encoder inputs and determines from the signals in outputs 216 and 218 the direction of the tilt and thus the direction that the decade counter must count. This is indicated to a decade counter 224 by means of a signal applied to a direction input 226 taken from a direction output 228 of direction zero detect logic circuit 222. The decade counter 224 counts pulses from the output 216 applied to its input 230 and counts either up or down depending upon the status of the signal applied to its direction input 226. When a count greater than nine is developed in the decade counter, it causes a pulse to be generated on its carry output 232 which is applied to trigger a carry flip-flop 234 to drive the pitch angle display tens place digit. The units place digit, on the other hand, is driven by a display decoder 236 which receives four binary outputs from decade counter 224 on bus 238 and drives the seven bar segments to make the various decimal representations. Preferably, the Trendelenberg, or pitch angle, does not exceed either positive or negative fifteen degrees with respect to horizontal. The direction and zero detect logic circuit 222 produces a sign signal on an output 238 which is coupled to the pitch angle display 40A to produce a negative sign in the event of the Trendelenberg pitch angle being in a negative direction.

While a preferred embodiment has been disclosed in detail, it should be understood that this has been done to provide an enabling disclosure and that the scope of the invention is not so limited but rather is defined by the following claims.

We claim:

1. In a therapeutic table having a frame, a patient support movably mounted to the frame and a drive mechanism for powering angular movement of the patient support to a plurality of positions relative to the frame, an improved controller for electronically controlling the relative movement, comprising:
   means for electronically sensing a plurality of said successive relative positions of the patient support during relative movement thereof;
   means for electronically encoding first and second preselected angular positional references;
   means for successively comparing the sensed relative positions with the angular preselected positional references during said relative movement; and
   means for controlling the drive mechanism in accordance with said successive comparisons to periodically reciprocally move said patient support between said first and second positioned references.

2. The controller of claim 1 in which
   said patient support is rotatably mounted for periodic tilting movement;
   said sensing means senses the angle of tilt of the patient support; and
   said encoding means encodes an angular tilt as the positional reference.

3. The controller of claim 2 in which said patient support is rotatably mounted for periodic tilting movement in at least one direction away from horizontal.

4. The controller of claim 1 including means for alternately selecting the one and the other encoded positional reference for comparison with the sensed position during reciprocal movement of the patient support therebetween.

5. The controller of claim 1 in which said sensing means includes a synchronous shaft encoder for sensing said plurality of successive positions,
   a detector for detecting when the patient support is in a preselected marking position; and
   means responsive to both the shaft encoder and the marking position detector to encode the sensed position for comparison with the preselected positional reference.

6. In a therapeutic table having a frame, a patient support mounted to the frame for substantially continuous relative rotary, reciprocal movement with respect thereto between limits on opposite sides of a horizontal position and a drive mechanism for powering said relative movement to impart motion therapy to a patient, said relative movement requiring mechanical work, an improved controller for controlling said relative rotary, reciprocal movement, comprising:
   means for measuring the mechanical work required for said relative rotary, reciprocal movement;
   means for establishing a preselected rotary mechanical work reference;
   means for comparing the measured mechanical work with the mechanical work reference to sense a jam condition; and means for controlling the drive mechanism in accordance with said comparison to terminate the relative reciprocal movement substantially immediately in response to sensing of said jam condition.

7. The controller of claim 6 in which said mechanical work measuring means includes a strain gage for measuring strain on a member which varies with variations of the mechanical work required to move the patient support.

8. The controller of claim 6 in which said mechanical work measuring means includes means for measuring torque.

9. The controller of claim 6 in which
said comparing means includes a differential amplifier with a pair of inputs;
means for connecting one of the inputs to the work measuring means to receive a work representative signal therefrom; and
means for connecting the other input to a preselected reference potential representative of said work reference.

10. The controller of claim 6 including
means for generating an immediate jam signal immediately in response to the comparing means detecting a preselected difference between the measured work and the work reference and
said controlling means includes means to stop movement of the patient support in the direction it was moving upon generation of said immediate jam signal immediately in response to said immediate jam signal.

11. The controller of claim 10 including
means for generating a delayed jam signal a preselected time period after said immediate jam signal, and
in which said controlling means includes means responsive to the delayed jam signal for removing power from the drive mechanism at the end of the preselected time period.

12. The controller of claim 10 in which said controlling means includes means responsive to the immediate jam signal for reversing the direction of power applied to the drive mechanism during the preselected time period.

13. In a therapeutic table having a frame, a patient support movably mounted to the frame and a drive mechanism for powering periodic relative movement of the patient support, an improved controller, comprising:
means for automatically controlling the drive mechanism to cause periodic reversal of the relative movement of the patient support;
means for sensing a fault condition; and
means responsive to said sensing means to reverse the relative movement of the patient support intermediate the automatic periodic reversals.

14. The controller of claim 13 in which said fault condition includes a jam condition in which movement of patient support is resisted by a preselected amount.

15. The controller of claim 13 in which
said patient support includes a head support movable to a relatively elevated position with respect to the patient support; and
means responsive to the condition of the head support being in said relatively elevated position to prevent movement of the patient support.

16. The controller of claim 13 in which said fault condition sensing means includes means for sensing relative movement of a patient support beyond a preselected limit.

17. The controller of claim 16 in which said fault condition sensing means includes means for sensing relative movement of the patient support beyond another limit which is selected separately from the one preselected limit.

18. The controller of claim 13 including
a time delay circuit for generating a fault signal a preselected time period after sensing of a fault condition; and
means for stopping reverse relative movement of the patient support at the end of said time period.

19. The controller of claim 13 including means for stopping relative movement in response to sensing of a fault condition.

20. The controller of claim 13 including means for stopping the patient support in a horizontal position in response to sensing of a fault condition.

21. In a therapeutic table having a frame, a patient support mounted to the frame for relative rotary reciprocal movement between limits on opposite sides of a horizontal position, an improved automatic controller, comprising:
means for sensing the angular position of the patient support relative the horizontal position on either side thereof;
means for preselecting a first angular reference position on one side of the horizontal position;
means for preselecting a second angular reference position on the other side of the horizontal position opposite the one side independently of the preselection of the first angular position;
means for causing the patient support to automatically rotate in one direction until it reaches said first angular reference position; and
means for causing the patient support to automatically rotate in another direction opposite to said one direction when it reaches said second angular reference position.

22. The controller of claim 21 including means for causing the patient support to momentarily pause when it reaches either of said preselected angular reference positions.

23. The controller of claim 21 including
means for manually preselecting each of the preselected reference angles, and
means associated with the preselecting means for displaying a numerical indication of the preselections.

24. The controller of claim 21 including means for visually displaying the actual angle of the patient support relative to the frame during relative movement therebetween.

25. The controller of claim 21 including
a pair of limit switches respectively associated with said limit positions of the preselected reference angles, and
means responsive to actuation of either of said limit switches to cause reversal of actuation of relative movement of the patient support until a horizontal position is reached.

26. The controller of claim 21 including means responsive to selection of an angular position beyond a preselected limit position to inhibit movement of the patient support.

27. The controller of claim 26 including means responsive to selection of an angular position beyond the preselected maximum limit position to provide an indication of an invalid input selection.

* * * * *